(12) United States Patent
Vincent

(10) Patent No.: US 9,602,642 B2
(45) Date of Patent: Mar. 21, 2017

(54) PLACEMENT OF AN ANTENNA IN A WRIST WORN DEVICE

(71) Applicant: ARM IP LIMITED, Cambridge, Cambridgeshire (GB)

(72) Inventor: Hugo John Martin Vincent, Cambridge (GB)

(73) Assignee: ARM IP Limited, Cambridge (GB)

(*) Notice: Subject to any disclaimer, the term of this patent is extended or adjusted under 35 U.S.C. 154(b) by 0 days.

(21) Appl. No.: 14/911,726

(22) PCT Filed: Aug. 19, 2014

(86) PCT No.: PCT/GB2014/052539
§ 371 (c)(1),
(2) Date: Feb. 11, 2016

(87) PCT Pub. No.: WO2015/025152
PCT Pub. Date: Feb. 26, 2015

(65) Prior Publication Data
US 2016/0205229 A1   Jul. 14, 2016

(30) Foreign Application Priority Data

Aug. 19, 2013 (GB) .................................. 1314759.0

(51) Int. Cl.
*H04M 1/00* (2006.01)
*H04M 1/02* (2006.01)
(Continued)

(52) U.S. Cl.
CPC ............ *H04M 1/026* (2013.01); *G04R 60/12* (2013.01); *H01Q 1/273* (2013.01); *H04B 1/385* (2013.01); *H04B 2001/3861* (2013.01)

(58) Field of Classification Search
CPC ....................... H04B 2001/3855; H04M 1/026
(Continued)

(56) References Cited

U.S. PATENT DOCUMENTS

2004/0145975 A1    7/2004  Barras et al.
2005/0219955 A1*  10/2005  Xu .................... G04G 21/04
                                                       368/88
(Continued)

FOREIGN PATENT DOCUMENTS

DE           102 42 494 A1    3/2004
DE     20 2009 000651 U1      6/2009
(Continued)

OTHER PUBLICATIONS

GB Examination Report for GB 1314759.0, dated Feb. 8, 2016, 5 pages.
(Continued)

*Primary Examiner* — Keith Ferguson
(74) *Attorney, Agent, or Firm* — Patterson Thuente Pedersen, P.A.

(57) ABSTRACT

A wrist worn device having a main body portion and a strap portion. The main body portion comprises a housing for housing a processor, communication circuitry, a screen and tin antenna. The strap portion comprises a strap for attaching the main body portion to a wrist. The housing comprises a central portion that supports the screen and edge portions arranged around the central portion, one of the portions comprising a non-conductive section on an outer surface of said wrist worn device facing away from said wrist when worn; wherein the antenna is supported within the housing in the one of the edge portions comprising the non-conductive section, such that there is an electromagnetic wave path from the antenna to the outer surface through at least a portion of the non-conductive section wherein a portion of the strip overlays the antenna and a portion of the non-conductive section at the outer surface, the portion of the snap comprising a non-conductive portion.

15 Claims, 7 Drawing Sheets

(51) Int. Cl.
*H01Q 1/27* (2006.01)
*H04B 1/3827* (2015.01)
*G04R 60/12* (2013.01)

(58) Field of Classification Search
USPC ..... 455/575.7, 575, 1, 550.1, 90.1–90.3, 73, 455/344, 566, 575.6; 368/13, 14, 88, 281; 343/702, 718, 720
See application file for complete search history.

(56) References Cited

U.S. PATENT DOCUMENTS

| | | | |
|---|---|---|---|
| 2010/0315389 A1 | 12/2010 | Sorrell et al. | |
| 2012/0122519 A1* | 5/2012 | Jochheim | H04B 1/385 455/556.1 |
| 2013/0016016 A1* | 1/2013 | Lin | H01Q 1/273 343/702 |
| 2013/0051181 A1* | 2/2013 | Fujisawa | G04R 20/02 368/14 |

FOREIGN PATENT DOCUMENTS

| | | |
|---|---|---|
| EP | 0 703 513 A1 | 3/1996 |
| EP | 1 274 150 A1 | 1/2003 |
| EP | 2 026 408 A1 | 2/2009 |
| EP | 2 276 108 A1 | 1/2011 |
| EP | 2 284 948 A1 | 2/2011 |
| EP | 2 293 158 A2 | 3/2011 |
| EP | 2 410 390 A1 | 1/2012 |
| EP | 2 474 872 A2 | 7/2012 |

OTHER PUBLICATIONS

Search Report dated May 27, 2016 for GB Application No. GB1314759.0, 2 pages.

International Search Report and Written Opinion for PCT/GB2014/052539, mailed Dec. 5, 2014, 13 pages.

* cited by examiner

PLACEMENT OF AN ANTENNA IN A WRIST WORN DEVICE

RELATED APPLICATIONS

The present application is a National Phase entry of PCT Application No. PCT/GB2014/052539, filed Aug. 19, 2014, which claims priority from GB Patent Application No. 1314759.0, filed Aug. 19, 2013, said applications being hereby incorporated by reference herein in their entirety.

FIELD OF THE INVENTION

The present invention relates to the field of mobile devices and in particular, of wrist worn devices and the placement of antennae in such devices.

BACKGROUND OF THE INVENTION

Mobile devices are becoming ever smaller, and mobile devices that are worn on a wrist are necessarily limited in size. Furthermore, given their small size much of the outer surface will be covered by a screen in order to allow the screen to have an acceptable size to display information. The electronic components of such devices will generally be contained within a main body portion beneath the screen and will generally be protected by a metal casing.

Traditionally wrist worn devices have simply indicated time and perhaps had some alarm function. With reducing size of electronic components it may be advantageous to provide wrist worn devices with additional functionality and perhaps with communication circuitry such that they can receive and transmit information. Such communication circuitry will need an antenna to output and receive the radiation, the size and type of the antenna being dependent on the wavelength of the radiation. Arranging such an antenna on a device of a constrained size that is worn by a user, such that only one face is outward looking, and that may additionally have a metal casing to protect electronic components is challenging.

SUMMARY OF THE INVENTION

Described is a wrist worn device comprising:
a main body portion and a strap portion;
the main body portion comprising a housing for housing a processor, communication circuitry, a screen and an antenna;
the strap portion comprising a strap for attaching the main body portion to a wrist;
the housing comprising a central portion that supports the screen and edge portions arranged around the central portion, one of the two edge portions comprising a non-conductive section on an outer surface of the wrist worn device facing away from the wrist when worn; wherein
the antenna is supported within the housing in the one of the edge portions comprising the non-conductive section, such that there is an electromagnetic wave path from said antenna to the outer surface through at least a portion of said non-conductive section; and
wherein a portion of the strap overlays said antenna and a portion of the non-conductive section at the outer surface, said portion of the strap comprising a non-conductive portion.

Wrist mounted devices are necessarily very limited in size. Furthermore, much of the outer surface is required for a display if the display is to be of sufficient size to be useful for a user. In such wrist mounted devices generally there is a central housing that contains much of the electronic circuitry and there is a strap for attaching the device to the user. The casing that contains the electronic circuitry is generally made of conductive material, such as metal, as this may be both robust and provide some shielding of the electronic circuitry. A disadvantage of this is that if the wrist mounted device requires an antenna then the conductive casing will also act as a shield for such an antenna.

Furthermore, as the device must operate when worn, such devices have the additional constraint that if the antenna is to be effective then it must be able to transmit and receive radiation through an outer surface when worn and this surface is largely taken up with the display screen. One solution might be to mount the antenna within the strap portion, but this presents its own problems requiring connections to run between the strap portion and the body to connect the antenna with the electronic circuitry which is generally mounted within the central housing.

The present invention has addressed these competing problems by placing the antenna within the housing on an edge portion and has provided the edge portion with a non-conductive section on an outer surface. The present invention recognizes that although a wrist worn device's size is constrained by the fact that it is worn on a wrist, there may be some portions at the edge of the outer surface that are not taken up by the screen and are therefore possible locations for an antenna. Placing the antenna here and having a non-conductive outer section at this point allows the electromagnetic waves to travel to and from the antenna as required. In this way, an antenna can be provided in a limited space and still be effective. Furthermore, by placing the antenna towards a periphery of the housing, it is only this portion of the housing that needs to be designed with the requirements of the antenna in mind, such that any restrictions in materials that are required to support an antenna's function do not impact on the central portion.

In some embodiments, the housing may comprise a conductive casing for supporting the screen, the screen forming an outer surface of the wrist worn device facing away from the wrist when worn.

In some embodiments, two of the edge portions comprise attachment means for attaching to the strap, the non-conductive section being located on one of the two edge portions comprising the attachment means.

Although the antenna can be placed in any of the edge portions, the edge portions where the attachments to the strap are formed are generally of a reasonable size in order to provide a robust attachment. They therefore provide a particularly suitable site for the placement of an antenna. Furthermore, where the strap is non-conductive the strap can extend over the antenna without interfering with its function, thereby providing a device which makes efficient use of this space and whose housing appears smaller than it is. Providing the antennae within a periphery of the housing allows the connections to the other circuitry to be provided in a robust and secure manner, while the requirements of the antenna do not impact on the design of the central portion. It should be noted that the attachment means may be of any form that allows a strap to retain the main body portion. Thus, they may be specially designed features such as clips or split pins designed to attach to and hold a strap, or they may alternatively simply be the particular shape of the edge portion that can be received within a strap designed to encompass the housing.

In some embodiments, the central portion has a planar surface and at least one of the edge portions is arranged at an angle to the central portion, the angle being such that the at least one of the edge portions follows a contour of the wrist when worn, the non-conductive section being located on one of the at least one of the edge portions.

In order to make efficient use of the available space of a wrist worn device, it may be advantageous if the central portion is substantially planar allowing the screen to be easy to view, while the edge portions are angled with respect to this screen such that they follow the contour of a wrist. In this regard it should be clear that wrists have different sizes and shapes and the following of the contour does not require an exact fit for all wrist sizes, simply that the edge portions are angled in the same direction as the contour of a wrist such that they bend towards the wrist as opposed to lying flat or bending away from it. In this way the device will sit snugly on a wrist and efficient use will be made of the available space without the device appearing or feeling too cumbersome. This allows the size of the housing to be increased compared to the size it would be were it to be simply flat, without the wrist worn device appearing much larger. Thus, additional area is provided that is within the main housing and yet is not constrained by the size or mounting of the screen.

Although only one of the edge portions may be angled to follow the contour of the wrist and this may provide the additional space for mounting the antenna, in some embodiments, two of the edge portions are arranged at an angle to the central portion, the angle being such that the edge portions follow a contour of the wrist when worn.

Providing two opposing edge surfaces angled in this way provides an attractive symmetrical design where the additional area that is provided from angled edge surfaces is provided for both of the edges that are situated such that they can follow the contour of the wrist when the device is worn. These two edge portions are the edge portions that are suitable for mounting the strap. So that in some embodiments the at least two of the edge portions comprising the attachment means are arranged at the angle to the central portion such that the at least two of the edge portions follow a contour of the wrist when the wrist worn device is worn.

In some embodiments, the antenna is arranged between an inner surface of the conductive casing facing the wrist when worn and the non-conductive section.

The conductive casing is required to support the screen but may in some embodiments extend along the inner surface to the edge portions, the inner surface facing and being generally adjacent or at least close to the wrist when worn. This provides a robust casing and some shielding of the electronic circuitry. The outer surface has a non-conductive section and arranging the antenna between the inner casing and the non-conductive section allows the electromagnetic waves to travel from the antenna through the outer surface through this non-conductive section. In this way the waves travelling away from the user are not impeded by the conductive section, yet the robustness of the casing is maintained as there is still the conductive layer underneath.

In some embodiments, the strap is attached to the conductive casing,

It is advantageous if the strap is non-conductive, or at least the portion that connects with the casing is not conductive. The strap may overlay a section of the outer surface of the main body portion including a portion of the non-conductive section and provided that is formed of a non-conductive material, which is often the case it will not interfere with the antenna. Arranging the strap in this way allows a portion of the housing to extend into what appears to be the strap, allowing the device to be larger than it appears and providing a space for the antenna within the housing allowing ease of connections with the electronic circuitry, while appearing to be within the strap improving the aesthetics of the device and making it appear smaller and less unwieldy.

In some embodiments, the wrist worn device further comprises a light generating circuit mounted within the housing; and wherein
the non-conductive section comprises a transparent plastic section and is arranged to allow light generated by the light generating circuit to pass to the outer surface.

In some cases, the wrist worn device might advantageously comprise a light generating circuit that can signal certain information to a user in a quick to read and understand, low information manner. For example, it may simply transmit a light of a particular color, the color selected indicating that some procedure has been successful or unsuccessful, or that some circuit is ready or not. It is advantageous if the plastic section that is required to output the light from the light generating circuit is used both for this purpose and for providing an electromagnetic wave path for the antenna. In this way, efficient use is made of the very limited space available.

In some embodiments, the transparent plastic section comprises a light guiding section, such that light received from the light generating circuit is guided to the outer surface of the transparent plastic section, the light generating circuit being mounted such that it is not between the antenna and the plastic section.

One potential problem associated with the dual use of this plastic section is that the light generating circuit, which may for example be one or more light emitting diodes, needs to be able to transmit light through the plastic section but not impede the electromagnetic radiation that the antenna needs to transmit and/or receive. One way of addressing this is by the use of a light guiding section that provides a channel for the light to flow through and allows the light generating means and the antenna to both use the plastic section to communicate with the outside.

In some embodiments, the light generating circuit is arranged at a side of the transparent plastic section such that light received from the light generating circuit is reflected through an angle of between 45 and 135 degrees in the light guiding section on a path to the outer surface.

The light guiding section may use reflection to guide the light though a particular angle. It is advantageous if it bends it by a substantial amount compared to its original path perhaps by an angle of 90 degrees and in any case between 45 and 135 degrees.

In some embodiments, the antenna comprises an antenna configured for frequencies of between 1 and 3 GHz and electrical signals.

Although the antenna can be designed for a number of different frequencies, it may be advantageous if it is an antenna that is suitable for frequencies of between 1 and 3 GHz. Such antennas will fit within a reasonably small space and can be used for frequencies that are useful for communication across several meters.

In some embodiments, the wrist worn device comprises at least one further antenna arranged within the one of the edge portions close to the antenna, the antenna being configured for electromagnetic waves in a 2.4 GHz band and the further antenna comprising a GPS antenna configured for electromagnetic waves of 1.575 GHz.

It may be advantageous to have two antennae mounted within the edge portion, both transmitting and receiving electromagnetic radiation through the non-conducting portion. One may be configured for electromagnetic waves in a 2.4 GHz band and the other might comprise a GPS antenna configured for electromagnetic waves of 1.575 GHz. These are well known communication frequencies for use in either GPS scenarios or in communication across several meters using known standards.

In some embodiments, the wrist worn device further comprises a near field antenna configured for 13.56 MHz, and display circuitry arranged under a central region of the screen, such that data displayed on the display circuitry can be viewed through the screen, the display circuitry and the screen forming a layered display unit;

the further near field antenna being arranged and mounted on the screen such that the antenna does not obstruct a view of the display circuitry.

In addition to the one or more antenna mentioned earlier, it may be advantageous to have a near field antenna that is configured for 13.56 MHz. Such an antenna will have a different form to the previous antennas and as such, it has been found that it is advantageous if it is mounted on the screen. This allows it to make use of the relatively large area that the screen has. Furthermore, as the screen must be transparent to light, it is formed of a material transparent to electromagnetic waves in general making it suitable for mounting an antenna, although the antenna should be mounted such that it does not obstruct a view of the display circuitry.

The form of this antenna makes it suitable for mounting on the display while not obscuring the image as it may be made either from at least one track of transparent indium tin oxide or by using opaque conductive metal to from the at least one track, this opaque track(s) being mounted around an edge of the screen, which is acceptable where only the central part of the screen is used to display an image.

Screens are generally formed with a frame around them in which the image is not displayed. Thus this region can be used for mounting conductive tracks without obscuring the image. Such tracks can carry a significant current allowing the antenna to be used for transmission as well as reception. Alternatively, a transparent conductor could be used. This has the advantage of allowing more of the screen to be used for mounting the conductor, but the disadvantage is that these conductors are generally of a relatively high resistance and not able to carry as much current as copper for example.

In some embodiments, the wrist worn device further comprises a low frequency antenna configured for a frequency of between 10 and 200 KHZ, the low frequency antenna being arranged at another side of the display circuitry to the screen.

There may be a further antenna within the device and this may be a low frequency antenna. It may be advantageous to mount this on the other side of the display circuitry to the screen. It has been found that mounting it here allows it to have a reasonable length of coiled conductive track and yet maintain it far enough from the near field antenna for there to be only minor interaction between the two.

Also described is a wrist worn device comprising:
a main body portion and a strap portion;
the main body portion comprising a housing for housing a processor, communication circuitry, a screen and an antenna;
the housing comprising a casing for supporting the screen, the screen forming an outer surface of the wrist worn device facing away from the wrist when worn;
the strap portion comprising a strap for attaching the casing to a wrist;

the housing comprising a central portion that supports the screen and edge portions arranged around the central portion, one of the portions comprising a non-conductive section on the outer surface,
wherein the strap is engageable with the casing to retain the main body portion;
wherein a portion of the strap overlays a portion of the non-conductive section at the outer surface, the portion of the strap comprising a non-conductive portion; and
wherein the antenna is supported within the housing in the portion of the non-conductive section overlaid by the non-conductive portion of the strap such that there is an electromagnetic wave path from the antenna to the outer surface through at least a portion of the non-conductive section and the portion of the strap.

Also described is a wrist worn device comprising:
a main body portion and a strap;
the main body portion comprising a housing for housing a processor, communication circuitry, a screen and an antenna;
the strap being attachable to said main body portion and for attaching the wrist worn device to a wrist;
wherein when coupled to the main body portion, a portion of the strap overlays the antenna and a portion of the housing.

As noted previously, wrist mounted devices are necessarily very limited in size. Furthermore, much of the outer surface is required for a display if the display is to be of sufficient size to be useful for a user. In such wrist mounted devices generally there is a central housing that contains much of the electronic circuitry and there is a strap for attaching the device to the user. The casing that contains the electronic circuitry is generally made of conductive material, such as metal, as this may be both robust and provide some shielding of the electronic circuitry, the constraints on the material required for the strap are fewer, the requirement being some degree of flexibility comfort and robustness. Thus, straps are often made from non-conductive material.

Embodiments of the present invention have recognized that the constraints on the casing are not felt by the strap and has addressed the problems by placing the antenna within the housing on an edge portion that is overlaid by the strap. Embodiments of the present invention recognize that although a wrist worn device's size is constrained by the fact that it is worn on a wrist, there may be some portions at the edge of the outer surface that are not taken up by the screen and are therefore possible locations for an antenna. Placing the antenna here and having a non-conductive outer section at this point allows the electromagnetic waves to travel to and from the antenna as required. Furthermore, as the strap may be formed at least partially from a non-conductive material, the strap can overlay the portion of the casing mounting the antenna without interfering with its function, thereby providing a device which makes efficient use of this space and whose housing appears smaller than it is. Providing the antenna within a periphery of the housing allows the connections to the other circuitry to be provided in a robust and secure manner, while the requirements of the antenna do not impact on the design of the central portion.

It should be noted that various optional features of the described wrist worn devices may be combined.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
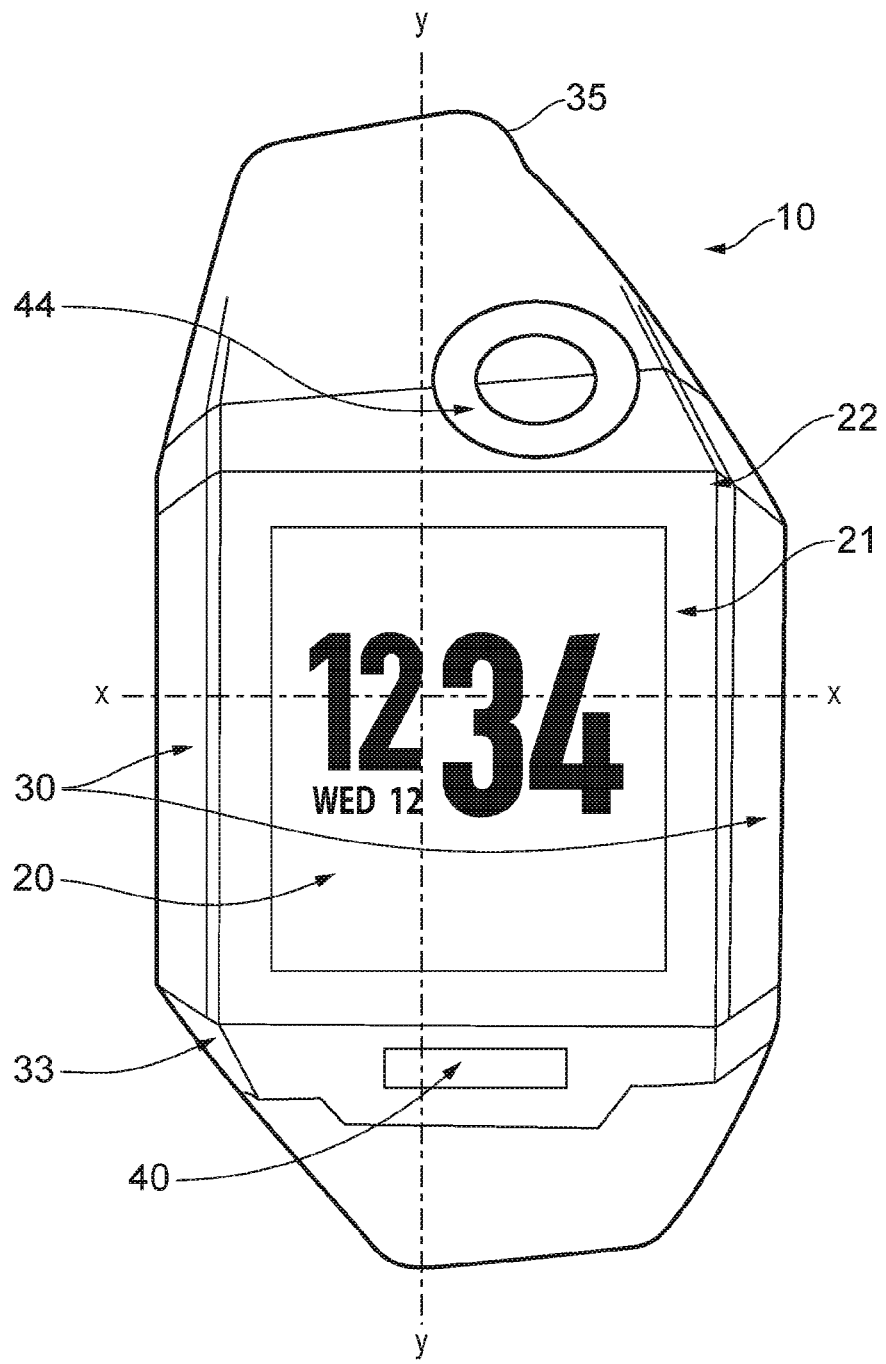
FIG. 1 shows a wrist worn device according to an embodiment of the present invention.

FIG. 1 shows a wrist worn device according to an embodiment of the present invention. It comprises a display screen 20 which in this Figure is displaying the time and date. The display screen can also display further information to the user.

The main section of the wrist worn device that houses the active components has a metal casing which serves as a robust mounting for the components and provides some shielding for the electronic circuits.

Much of the flat front surface 22 of the watch device is made up of the screen 20 with a framing area 21 around the display area 20.

There are inclined surfaces on either lateral side 30 on which user input devices are arranged (not shown) for a user to enter commands, such as selecting an item or zooming or scrolling through a display. There is a further user input button 33 towards the bottom left hand side of the screen which is also on an inclined angle.

The upper and lower edges to which the strap 35 is attached comprise a finger print sensor 40 on the lower edge and a light display 44 on the upper edge. The light display 44 is in this embodiment in the form of a ring and simply displays the output of an LED which may emit light in one of several colors, the color output indicating to the user a current operating condition of the device. For example, it may be green to indicate that the device is ready to communicate with another device or red if that is not yet the case.

The light is emitted through a plastic transparent portion 44 of the upper casing that is non-conductive. The strap 35 is also made of a non-conductive material.

In this embodiment, there is an antenna that is located towards the outer surface of the watch (when worn) and which can transmit and receive electromagnetic radiation though the plastic portion 44 and through a portion of the non-conductive strap 35. In this way, there is a portion of the wrist worn device that is provided with an antenna and that has a non-conductive outer surface allowing electromagnetic waves to travel to and from the antenna.

Figure 4:
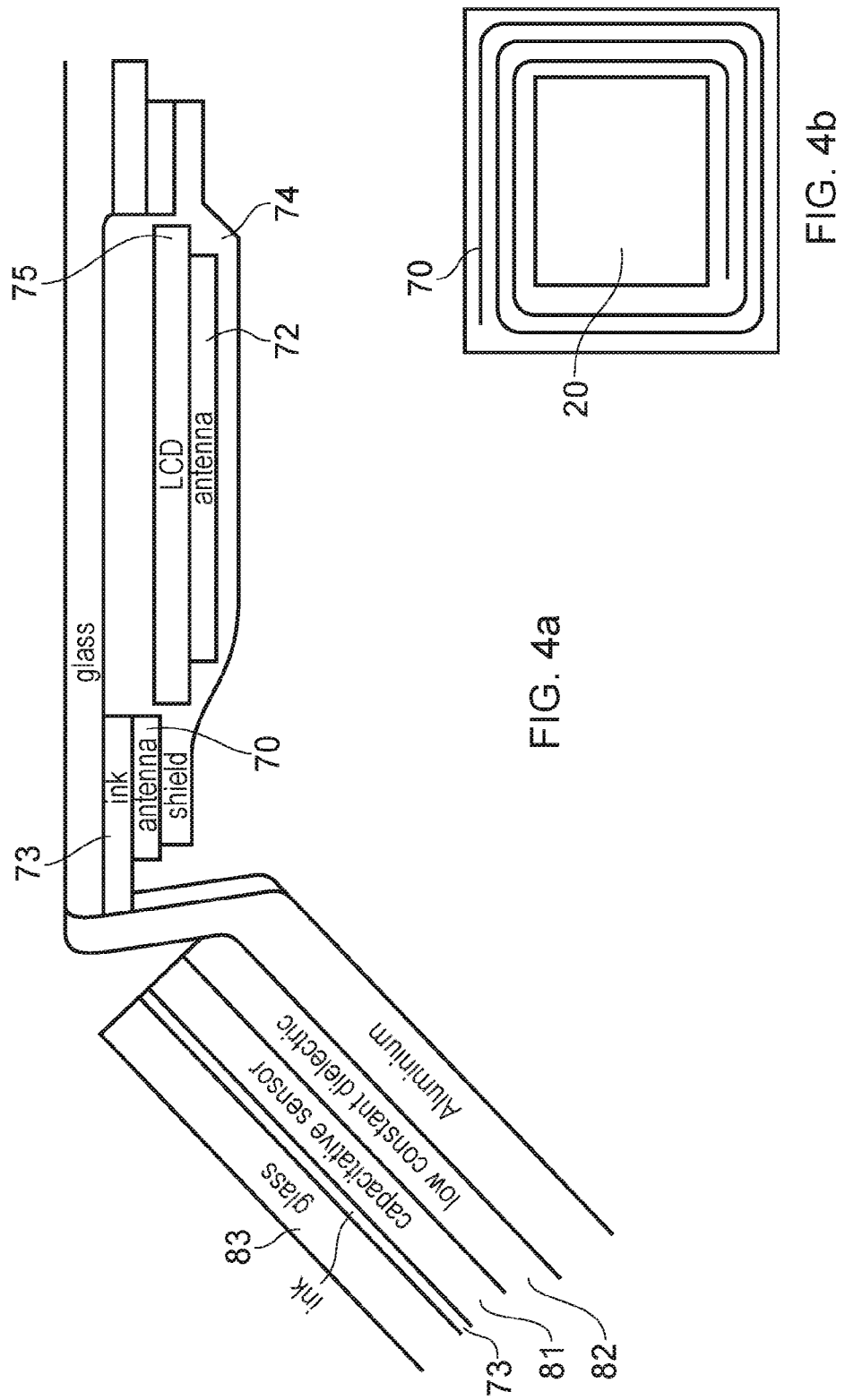
FIG. 4a shows a cross section through the screen and edge portion of a wrist worn device showing the display and antennae according to an embodiment of the present invention.
FIG. 4b shows a plan view of an antenna.

There are also two lower frequency antennae that are mounted behind the screen portion of the wrist worn device and as such are not shown in this figure. These are described in more detail in FIG. 4 and later figures. As these are lower frequency antennae to the one mounted towards the outer surface of the watch they have a different form requiring a certain length. These antennae are mounted behind the screen to take advantage of the large size and transparent nature of the screen that allows this form of antenna to be mounted and transmit and receive radiation through the screen. Furthermore, the use of the transparent screen and an edge portion of the watch to mount the different antennae allows them to be supported on a small device without undue interference between the antennae.

Figure 2:
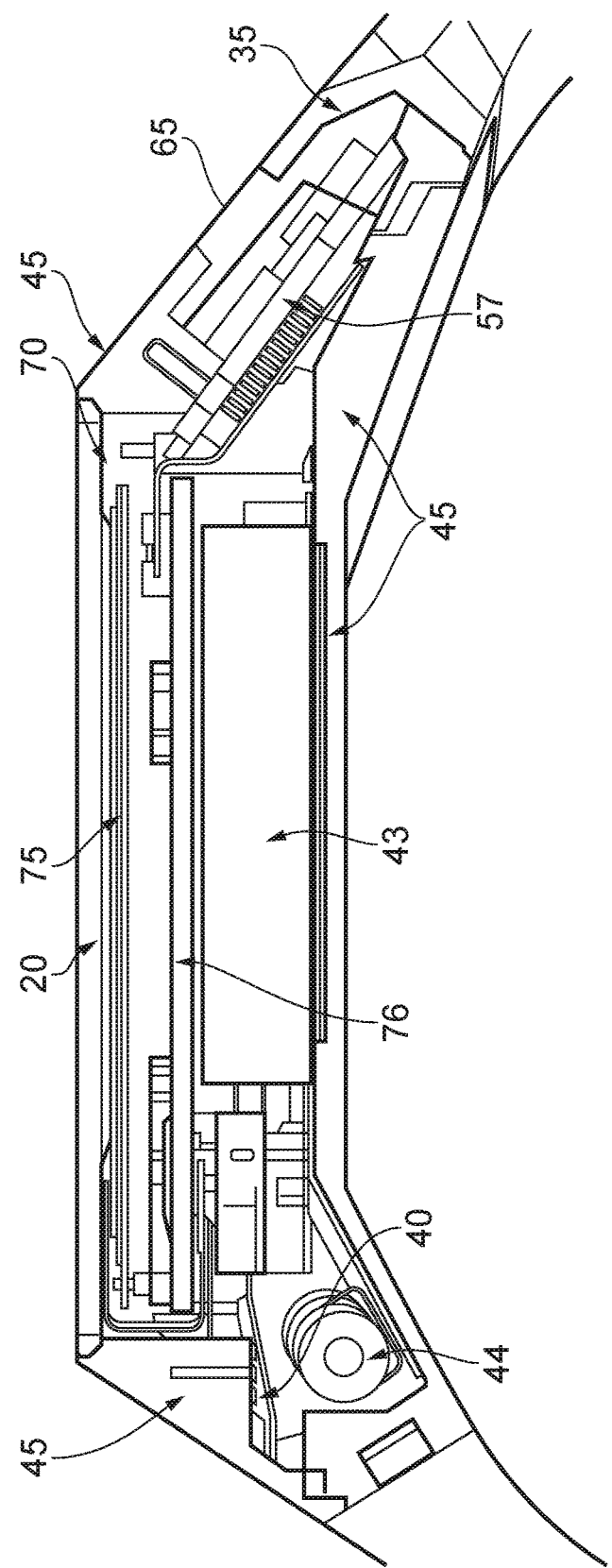
FIG. 2 shows a cross sectional view through a wrist worn device according to an embodiment of the present invention.

FIG. 2 shows a cross section of the wrist worn device of FIG. 1 through section y-y and in particular, shows the polycarbonate window 65 through which the light emitting diode (not shown) transmits light. There are two antennae mounted on a radio PCB board 57, the two antennae being configured for different electromagnetic wavelengths. In this embodiment, one of the two antennae is a GPS antenna configured for electromagnetic waves of 1.575 GHz and the other is a Bluetooth® antenna configured for electromagnetic waves in a 2.4 GHz band. As can be seen the portion of the wrist worn device that comprises the polycarbonate window and antennae is angled to follow the contours of the wearer's wrist. Angling the device in this way provides additional space for mounting these antennae in the portion of the device that does not comprise the screen, while still allowing them to be within the central housing.

Furthermore, as can be seen the bottom metal casing 45 which in this embodiment is formed from aluminium supports, these antennae also provide a support for the screen 20, however, it does not cover the antennae or shield them from the outer surface. The plastic strap 35 extends over a portion of the radio PCB (57).

In this embodiment the outer aluminium casing (45) extends under the central housing and up over the edge portions to support the screen 20. The right hand edge portion housing the antennae has a section of the outer surface where the metal does not extend and which instead has the polycarbonate window. By providing a window in this portion of the device, the main housing can be formed of a material whose properties are not governed by the requirements of the antennae, allowing a designer to select conductive materials such as aluminium, which is both lightweight and robust. Furthermore, by positioning the antennae towards a periphery of the main section of the device at an angled portion that also supports the strap, efficient use of the available space is made. Allowing the strap to extend over at least a portion of the antennae allows the device to appear smaller and more compact.

This Figure also shows battery 43, a vibration motor 44, a finger print sensor 40, main PCB 76, holding much of the electronic circuitry and the LCD display 75. There is also an RFID antenna 70 mounted around the edge of the screen that will be described later.

Figure 3:
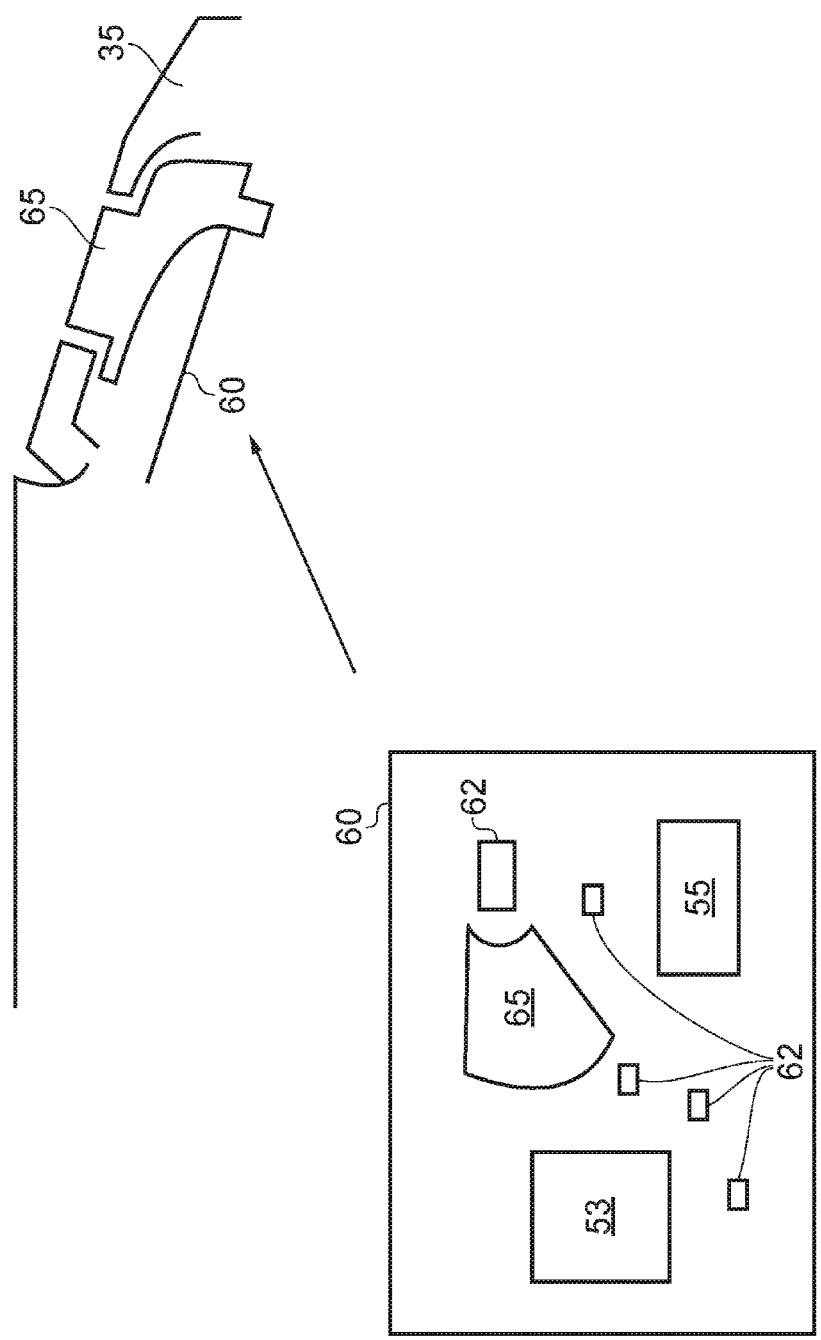
FIG. 3 shows an arrangement of an antenna light guide in a segment of a wrist worn device according to an embodiment of the present invention.

FIG. 3 shows a cross section of the device as shown in FIG. 2 with the radio circuit board shown in more detail. As can be seen LED 62 is mounted to one side of the polycarbonate waveguide 65 which directs the light to the window. This waveguide allows the light to be output without the LED being mounted directly under the window, thereby providing a free path for radiation to travel to and from the antennae. The antennae transmit radiation to and from the outside via the polycarbonate window and any other non-conductive covering that may be over this portion of the watch such as strap 35.

The PCB board 60 on which the devices are mounted holds Bluetooth® antenna 53 and GPS antenna 55 arranged such that when mounted on the wrist worn device neither are obscured by any conductive material but can receive and transmit electromagnetic radiation either via the polycarbonate window or via the polycarbonate window and strap.

LED 62 may be a plurality of LEDs each omitting light in a different visible wavelength, light from these LEDS travels via the polycarbonate waveguide window unit 65 which transmits the light from the LED to the external surface. It should be noted that there are copper portions 62 on the board 60 which form part of the antenna and help receive and transmit the radiation.

FIG. 4a shows a cross section through x-x of FIG. 1 which shows the display screen in detail and the one of the side portions which includes a touch sensor for receiving user inputs.

As can be seen from FIG. 4a there is an antenna 70 that is located at the edge portion of the screen and a further antenna 72 located underneath the display device which is an LCD 75.

The antenna 70 is a near field antenna that comprises in this embodiment plural rings of copper wire which run around the edge of the screen. This is shown in more detail in FIG. 4b. In this regard, as can be seen from FIG. 1 the screen has an edge portion which frames the screen and does not form a part of the display. Thus, it is possible to mount rings of copper wire in this portion and not obscure any image displayed. Furthermore, these wires can be masked with an optical mask 73 perhaps in the form of an ink or in the form of some glass sintering so that they are not visible.

Copper wires can carry a reasonable current and thus, they make an effective antenna for transmitting as well as receiving electromagnetic waves. Near field communication is performed at wavelengths of about 13.56 MHz and thus, an antenna having a reasonable length is required. Coiling a wire around the edge portion of the screen is a convenient way of mounting a reasonable length antenna in a small area. Furthermore, by mounting it in a non-visible position a relatively high conductor in the form of copper wire can be used such that a significant current in the regions of 70 mA can be carried.

There is a further low frequency antenna 72 which is mounted behind the LCD display 75 and is configured for frequencies of between 10 and 200 KHz. By mounting the antenna behind the liquid crystal display screen and at a certain distance from a near field communication antenna there is sufficient distance between these antennae for them not to interfere with each other. In this regard, antenna 72 is configured for low frequency wavelengths of the region of 10 to 200 KHz. This antenna is again formed of a length of coiled conductive tracks. The optimum length for this antenna is very long given the frequency of operation and as such, it will be not near its optimum length and the actual length can therefore be within quite a broad band without affecting performance unduly. As it is mounted behind the display it does not have to be transparent and the frequency of operation allows it to receive the electromagnetic radiation from behind the display.

There is a shielding layer that shields the electronic devices and these antennae from each other and in particular provides a path for a varying magnetic field that arises from the low frequency electromagnetic waves generated by the antennae. This shielding impedes the electronic components from interfering with the varying magnetic fields allowing the antennae to operate efficiently. The electronic circuitry is also protected from these magnetic fields.

FIG. 4b shows a plan view of the antenna 70 formed of copper coils around the edge of the screen 20 outside of the portion of the screen displaying the image 20. In other embodiments, the antenna may be formed of conductive tracks that are transparent and are mounted on the screen including on the portion of the screen displaying the image 20 as they will not obstruct the view of the image. Transparent conductors such as indium tin oxide tracks could be used for this. It should be noted that they have a lower conductivity than copper but in some cases they may provide sufficient conductivity to provide a reasonable antenna.

FIG. 4a also shows shield layer 74 that provides a high permeability path for the varying magnetic field created by the antennae and improves their efficiency and impedes any electronic circuitry mounted close to the display unit from interfering with the antennae.

The angled edge section carries an input device 81 in the form of a capacitive sensor. This capacitive sensor is mounted on a material 83 having a high dielectric constant which may be glass and thus may form a convenient outer surface for the device being robust, aesthetic and easy to clean. A low dielectric constant material 82 is arranged between the capacitive sensor and the metal casing, in this embodiment polytetrafluoroethylene is used. This allows the capacitive sensor to be mounted on aluminium which would generally interfere with it. There is again an optical mask 73 to obscure the capacitive sensor from view.

Figure 5:
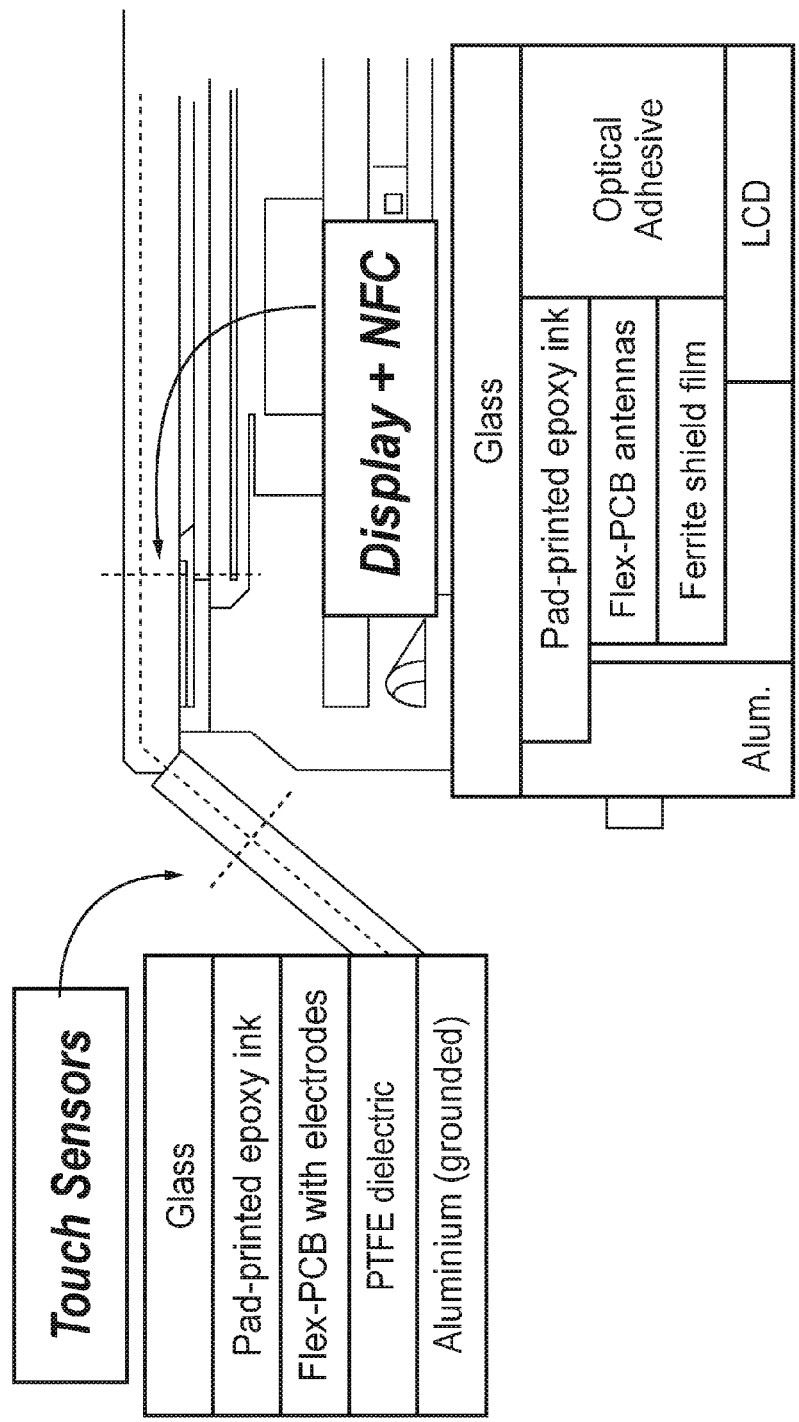
FIG. 5 shows a further cross section through showing the display and antennae.

FIG. 5 shows highlighted portions of the cross section of FIG. 4a. It shows a glass outer surface with pad printed epoxy ink in this embodiment acting as the optical mask. There is then the near field antenna mounted as tracks on a PCB and underneath there is a ferrite shield film which is made of a plastic that is impregnated with ferrite particles. This creates a high permeability material which acts to guide the varying magnetic field created by the electromagnetic waves that the antennae are transmitting or receiving. As they are configured for low frequency waves there is a considerable varying magnetic field associated with these antennae.

Figure 6:
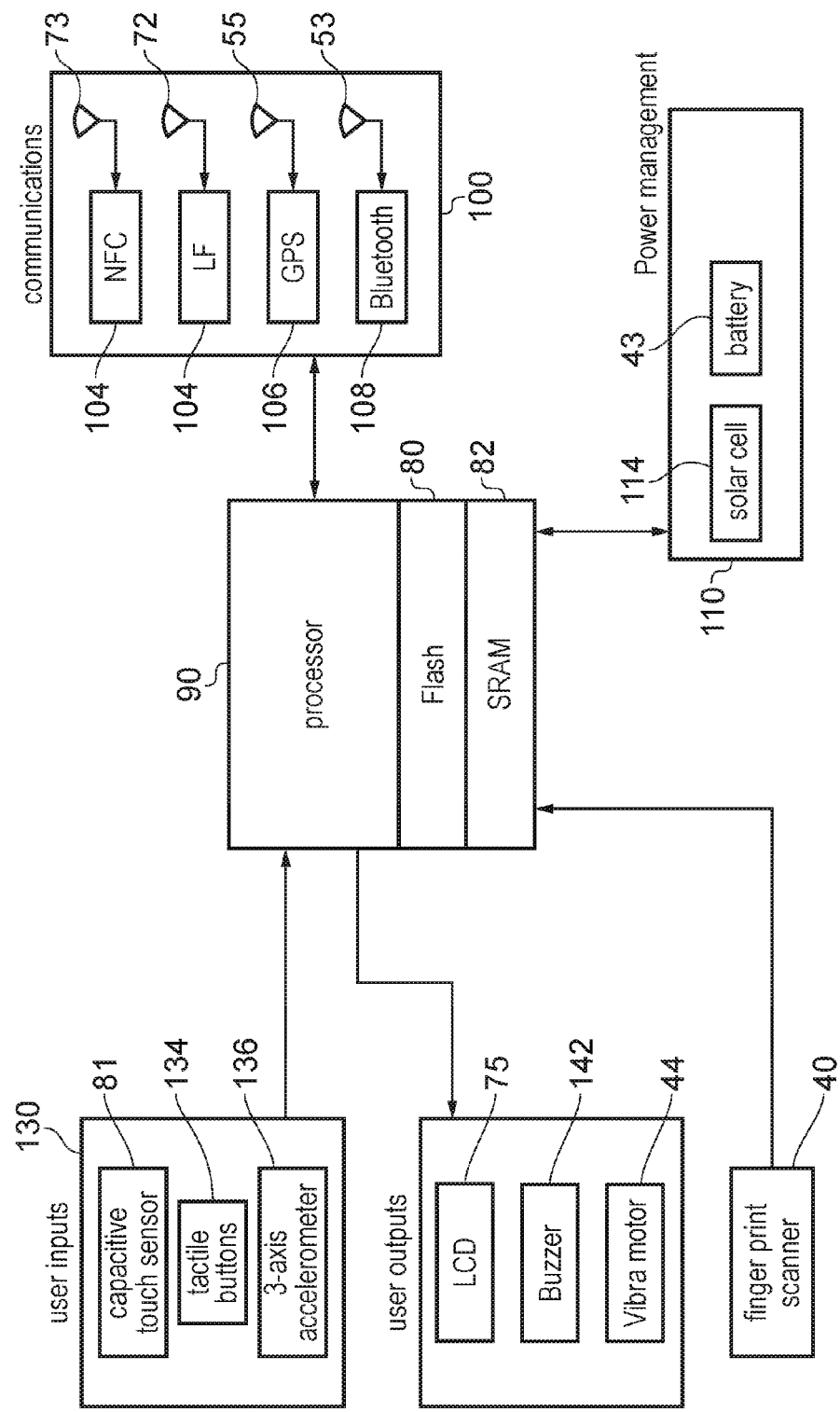
FIG. 6 provides a block diagram showing the elements of the wrist worn device according to an embodiment of the present invention.

FIG. 6 shows a block diagram illustrating the electronic circuitry that is found within this device. There is a processor 90 which is mounted in the main body of the device on the main PCB 76 (of FIG. 2). There are various storage devices in the form of flash and SRAM 80 and 82 respectively.

There is communication circuitry 100 that comprises near field communication circuitry 102 and an associated antenna 73, low frequency communication circuitry 104 and associated antenna 72, GPS communication circuitry 106 connected to antenna 55 and Bluetooth communication circuitry 108 connected to antenna 53.

The device is powered using power management circuitry 110 which is powered by a battery 43 and which is supplemented by solar cell 114. There is a fingerprint scanner 40 and various user inputs 130 including a capacitive touch sensor 81 located on the side of the device, tactile buttons 134 and a three axis accelerometer 136 to detect movement of the device. There are also user outputs in the form of the LCD display screen 75, a buzzer 142 and a vibration motion motor 44.

Figure 7:
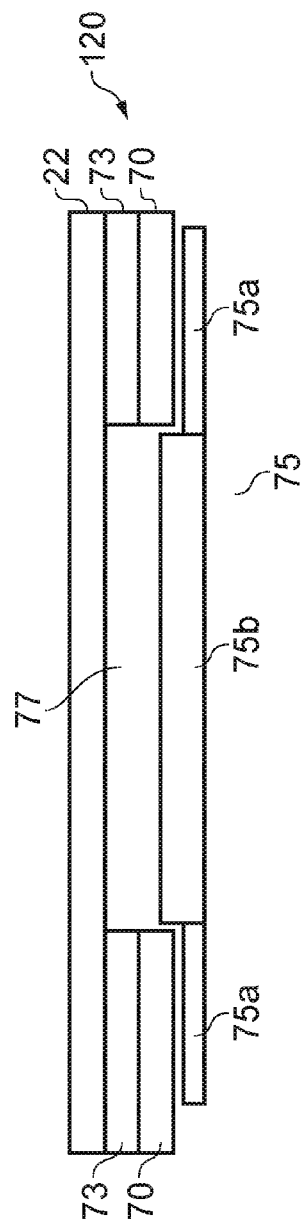
FIG. 7 shows a layered display unit.

FIG. 7 shows a display unit 120 according to an embodiment of the present invention. It comprises a glass screen 22, an optical mask 73 running around the edge of the screen and obscuring the antenna 70 from view. In this embodiment there is an OLED display 75 that is mounted to the glass screen 22 by optical adhesive 77. This OLED display 75 has a central image forming section 75b and outer control circuitry 75a. Antenna 70 is arranged between the outer control circuitry and the outer edge of the glass screen.

Figure 8:
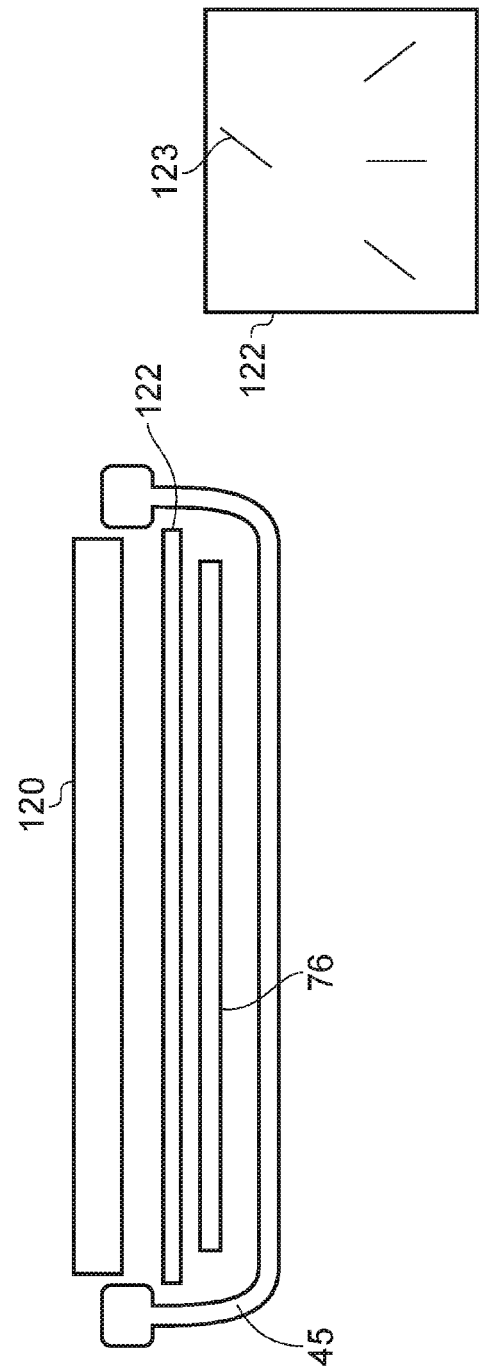
FIG. 8 shows the layered display unit mounted on a device.

FIG. 8 shows layered display unit 120 mounted in a device. There is a conductive layer 122 that is arranged between the display unit 120 and a PCB 76 holding the electronic circuitry of the device. This conductive shielding layer 122 has discontinuities in the form of slots 123 in its surface which act to impede the generation and flow of eddy currents. There may also be a further high permeability shielding layer between the display unit 120 and the conductive layer 122 (not shown) which provides a path for a magnetic field associated with the antennae. This high permeability layer may be part of the display unit or it may be separate to it. The display unit 120 and electronic circuitry are mounted in a conductive casing 45 which forms an outer surface of the device.

Various further aspects and features of the present invention are defined in the appended claims. Various modifications can be made to the embodiments herein before described without departing from the scope of the present invention.

The invention claimed is:

1. A wrist worn device comprising:
a main body portion and a strap portion;
said main body portion comprising a housing for housing a processor, communication circuitry, a screen and an antenna;
said strap portion comprising a strap for attaching said main body portion to a wrist;
said housing comprising a central portion that supports said screen and edge portions arranged around said central portion, one of said portions comprising a non-conductive section on an outer surface of said wrist worn device facing away from said wrist when worn; wherein
said antenna is supported within said housing in said one of said edge portions comprising said non-conductive section, such that there is an electromagnetic wave path from said antenna to said outer surface through at least a portion of said non-conductive section; and
wherein a portion of said strap overlays said antenna and a portion of said non-conductive section at said outer surface, said portion of said strap comprising a non-conductive portion.

2. A wrist worn device according to claim 1, wherein two of said edge portions comprising attachment means for attaching to said strap, said non-conductive section being located on one of said two edge portions comprising said attachment means.

3. A wrist worn device according to claim 2, wherein said at least two of said edge portions comprising said attachment means are arranged at said angle to said central portion such that said at least two of said edge portions follow a contour of said wrist when said wrist worn device is worn.

4. A wrist worn device according to claim 1, wherein said central portion has a planar surface and at least one of said edge portions is arranged at an angle to said central portion, said angle being such that said at least one of said edge portions follow a contour of said wrist when worn, said non-conductive section being located on one of said at least one of said edge portions.

5. A wrist worn device according to claim 1, said wrist worn device further comprising a light generating circuit mounted within said housing; and wherein
said non-conductive section comprises a transparent plastic section and is arranged to allow light generated by said light generating circuit to pass to said outer surface.

6. A wrist worn device according to claim 5, said transparent plastic section comprising a light guiding section, such that light received from said light generating circuit is guided to said outer surface of said transparent plastic section, said light generating circuit being mounted such that it is not between said antenna and said transparent plastic section.

7. A wrist worn device according to claim 6 wherein said light generating circuit is arranged at a side of said transparent plastic section such that light received from said light generating circuit is reflected through an angle of between 45 and 135 degrees in said light guiding section on a path to said outer surface.

8. A wrist worn device according to claim 7, comprising at least one further antenna arranged within said one of said edge portions close to said antenna, said antenna being configured for electromagnetic waves in a 2.4 GHz band and said further antenna comprising a GPS antenna configured for electromagnetic waves of 1.575 GHz.

9. A wrist worn device according to claim 1, wherein said antenna comprises an antenna configured for frequencies of between 1 and 3 GHz.

10. A wrist worn device according to claim 1, and further comprising a near field antenna configured for 13.56 MHz, and display circuitry being arranged under a central region of said screen, such that data displayed on said display circuitry can be viewed through said screen, said display circuitry and said screen forming a layered display unit;
said further near field antenna being arranged mounted on said screen such that said antenna does not obstruct a view of said display circuitry.

11. A wrist worn device according to claim 1, further comprising a low frequency antenna configured for a frequency of between 10 and 200 KHZ, said low frequency antenna being arranged at another side of said display circuitry to said screen.

12. A wrist worn device according to claim 1, wherein housing comprises a conductive casing for supporting said screen, said screen forming an outer surface of said wrist worn device facing away from said wrist when worn.

13. A wrist worn device according to claim 12, wherein said antenna is arranged between an inner surface of said conductive casing facing said wrist when worn and said non-conductive section.

14. A wrist worn device comprising:
a main body portion and a strap portion;
said main body portion comprising a housing for housing a processor, communication circuitry, a screen and an antenna;
said housing comprising a casing for supporting said screen, said screen forming an outer surface of said wrist worn device facing away from said wrist when worn;
said strap portion comprising a strap for attaching said casing to a wrist;
said housing comprising a central portion that supports said screen and edge portions arranged around said central portion, one of said edge portions comprising a non-conductive section on said outer surface,
wherein said strap is engageable with said casing to retain said main body portion;
wherein a portion of said strap overlays a portion of said non-conductive section at said outer surface, said portion of said strap comprising a non-conductive portion; and
wherein said antenna is supported within said housing in said portion of said non-conductive section overlaid by said non-conductive portion of said strap such that there is an electromagnetic wave path from said antenna to said outer surface through at least a portion of said non-conductive section and said portion of said strap.

15. A wrist worn device according to claim 14, wherein said central portion has a planar surface, said one of said edge portions comprising said non-conductive section being at an angle to said central portion such that said one of said edge portions follows a contour of said wrist when said wrist worn device is worn.

* * * * *